United States Patent
Sotriffer et al.

(10) Patent No.: US 11,063,855 B2
(45) Date of Patent: Jul. 13, 2021

(54) MONITORING OF THE DATA TRANSMISSION IN A CLIENT/SERVER-BASED DEVICE ACCESS SYSTEM

(71) Applicant: Endress+Hauser Process Solutions AG, Reinach (CH)

(72) Inventors: Ingomar Sotriffer, Gundelfingen (DE); Michael Mayer, Oberwil (CH); Werner Luber, Allschwil (CH); Mike Sutter, Kleines Wiesental (DE)

(73) Assignee: Endress+Hauser Process Solutions AG, Reinach (CH)

( * ) Notice: Subject to any disclaimer, the term of this patent is extended or adjusted under 35 U.S.C. 154(b) by 5 days.

(21) Appl. No.: 16/471,728

(22) PCT Filed: Nov. 22, 2017

(86) PCT No.: PCT/EP2017/080071
§ 371 (c)(1),
(2) Date: Jun. 20, 2019

(87) PCT Pub. No.: WO2018/114194
PCT Pub. Date: Jun. 28, 2018

(65) Prior Publication Data
US 2019/0334800 A1    Oct. 31, 2019

(30) Foreign Application Priority Data
Dec. 21, 2016   (DE) .................. 10 2016 125 171.2

(51) Int. Cl.
*H04L 12/26*    (2006.01)
*H04L 12/40*    (2006.01)
(Continued)

(52) U.S. Cl.
CPC .......... *H04L 43/0847* (2013.01); *H04L 12/40* (2013.01); *H04L 67/28* (2013.01); *H04L 67/42* (2013.01)

(58) Field of Classification Search
None
See application file for complete search history.

(56) References Cited

U.S. PATENT DOCUMENTS 5,581,690 A * 12/1996 Ellis .................... G06F 11/1076
714/6.22
6,411,987 B1 * 6/2002 Steger ..................... H04L 29/06
700/9

(Continued)

FOREIGN PATENT DOCUMENTS

| DE | 10 2010 040 055 | * | 3/2012 | ............. G05B 19/14 |
| DE | 102010040055 A1 | | 3/2012 | |
| EP | 3018635 A1 | | 5/2016 | |

OTHER PUBLICATIONS

Google Translation of DE 102010040055A1 (Year: 2020).*

*Primary Examiner* — Backhean Tiv
(74) *Attorney, Agent, or Firm* — Kelly J. Smith; Endress+Hauser (USA) Holding Inc.

(57) ABSTRACT

A device access apparatus for a client-server system is described, wherein the device access apparatus is used to access components of a field bus network. The device access apparatus includes a general application that is installable on a server and configured to interchange data with the components of the field bus network. The device access apparatus also includes a device driver that is installable on a client and a communication proxy that is installable on the server that are configured to set up a data connection between the server and the client. The data connection is used to transmit data between the device driver and one of the components of the field bus network that is associated (Continued)

with the device driver. The communication proxy is configured to monitor data traffic on the data connection between the client and the server and detect errors in the data transmission.

16 Claims, 4 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 9,473,346 B2* | 10/2016 | Houghton | H04L 69/162 |
| 2004/0203740 A1* | 10/2004 | Won | H04L 45/02 455/426.1 |
| 2007/0112974 A1* | 5/2007 | Shirogane | H04L 69/40 709/239 |
| 2008/0186965 A1* | 8/2008 | Zheng | H04L 29/12839 370/389 |
| 2010/0205244 A1* | 8/2010 | Todorov | H04L 67/12 709/203 |
| 2012/0182119 A1* | 7/2012 | Vetter | H04W 4/80 340/4.3 |
| 2013/0041485 A1* | 2/2013 | Gunzert | G05B 19/4186 700/79 |
| 2014/0379714 A1* | 12/2014 | Hankins | G06F 11/0751 707/737 |
| 2015/0172306 A1 | 6/2015 | Kim et al. | |
| 2016/0094057 A1* | 3/2016 | Fiedler | G05B 19/0426 320/107 |
| 2016/0094701 A1* | 3/2016 | Hund | H04L 12/2834 455/420 |
| 2016/0156698 A1* | 6/2016 | Kolblin | H04L 67/06 709/219 |
| 2019/0334800 A1* | 10/2019 | Sotriffer | H04L 43/0847 |

* cited by examiner

MONITORING OF THE DATA TRANSMISSION IN A CLIENT/SERVER-BASED DEVICE ACCESS SYSTEM

CROSS-REFERENCE TO RELATED APPLICATIONS

The present application is related to and claims the priority benefit of German Patent Application No. 10 2016 125 171.2, filed on Dec. 21, 2016 and International Patent Application No. PCT/EP2017/080071 filed on Nov. 22, 2017, the entire contents of which are incorporated herein by reference.

TECHNICAL FIELD

The invention relates to a device access apparatus for a client server system, comprising a server and a client, wherein components of a field bus network can be accessed by means of the device access apparatus. Moreover, the invention relates to a server which can be connected to a field bus network and to a system of automation technology which comprises a server and a client. The invention further relates to a method for monitoring the data traffic between a server and a client of a client-server system, via which components of a field bus network can be accessed.

BACKGROUND

Multiple field devices serving to detect and/or influence process variables are used in automation technology. Examples of field devices of this type are fill-level measurement devices, mass flow meters, pressure and temperature measurement devices, etc., which, as sensors, record the corresponding process variables, fill-level, flow rate, pressure, and temperature.

The parameterization, configuration, and condition monitoring of the field devices of a field bus network normally take place by means of a device access apparatus. The device access apparatus comprises a general application into which a plurality of drivers is integrated. The components of the field bus network can be accessed by means of the drivers. In the implementation of device access units, with which components of a field device network can be accessed, there is often the need to implement the device access unit by means of a client-server structure, because, in this way, a connection of mobile devices to a central server, for example, is made possible. The user can then parameterize and configure the field devices and other components of a field bus network on-site, for example. However, errors in the data transmission between server and client repeatedly occur in such systems. For example, newly-established data connections are not terminated correctly, so that more and more system resources are occupied, which, after some time, leads to system faults.

SUMMARY

It is an aim of the invention to provide a more reliable connection of a client to the server in a client-server-based system for accessing components of a field bus network.

This aim is achieved by the characteristics indicated in claims 1, 14, 15, and 16.

Advantageous developments of the invention are specified in the dependent claims.

A device access apparatus according to the embodiments of the invention is provided for use on a client-server-system comprising a server and a client, wherein components of a field bus network can be accessed with the device access apparatus. The device access apparatus comprises a general application which can be installed on the server and which is designed to interchange data with components of the field bus network, a device driver which can be installed on the client, and a communication proxy which can be installed on the server and is designed to establish at least one data connection between the server and the client, the at least one data connection being able to be used to transmit data between the device driver and a component of the field bus network that is associated with the device driver. The communication proxy is designed to monitor data traffic on the at least one data connection between the client and the server and to detect errors in the data transmission.

The device access apparatus is designed to operate on a client server system, wherein the device drivers for the components of the field bus system are installed on the client in a system of this type. For setting up the data connections between server and client, a communication proxy is provided on the server side which is responsible for setting up at least one data connection between server and client. Via this at least one data connection, the device driver installed on the client can access an associated component of the field bus network via the general application installed on the server. In this case, the data traffic flows between client and server via the communication proxy. Therefore, the communication proxy can additionally be used to monitor the data transmission between client and server and to detect errors in the data transmission. Moreover, the communication proxy may respond to errors, for example. Monitoring data traffic and early detection of errors associated with the ability to respond to the errors improve reliability in device access apparatuses running on a client server system. Faults which could affect the operation of the field bus network can thus be prevented.

Preferably, the communication proxy is designed to automatically initiate measures for error correction as a function of the error pattern when errors are detected. These conditions may include, for example, blocking an erroneous data stream so that it cannot cause further damage. Moreover, individual components can be restarted, for example. This watchdog function of the communication proxy improves the operational reliability and reliability of the client server system.

Preferably, the communication proxy is designed to terminate data connections between server and client that are not used over a predetermined period of time. Data connections that are no longer used by a client tend not to be released at a regular rate. These data connections, which are not properly terminated require, over time, an ever higher proportion of the system resources, until eventually there are faults. Such connections can be identified and terminated by means of the communication proxy. This relieves the resources and improves the reliability of the system.

A method corresponding to the embodiments of the invention is used for monitoring the data traffic between a server and a client of a client-server system, via which components of a field bus network can be accessed. On the server, a general application is installed, which is designed to interchange data with components of the field bus network. On the server, a communication proxy is installed which is designed to set up at least one data connection between the server and the client, the at least one data connection being able to be used to transmit data between a device driver installed on the client and a component of the field bus network that is associated with the device driver. The method includes monitoring a data traffic on the at least one data connection between client and server via the communication proxy and detecting errors in the data transmission.

BRIEF DESCRIPTION OF THE DRAWING

In the following, the invention is outlined in more detail with the aid of exemplary embodiments depicted in the drawings. The figures show:

FIG. 1 the structure of a field bus network and an associated device access software, with drivers incorporated therein;

FIG. 2 data transmission in both directions between a client, a server, and a field device;

FIG. 3 a detailed illustration of the attachment of two clients to a server, wherein the data exchange is handled via a communication proxy; and FIG. 4 the monitoring of the data transmission via the communication proxy, which reconciles the data transmission between client and server with a predetermined set of rules.

DETAILED DESCRIPTION

Figure 1:
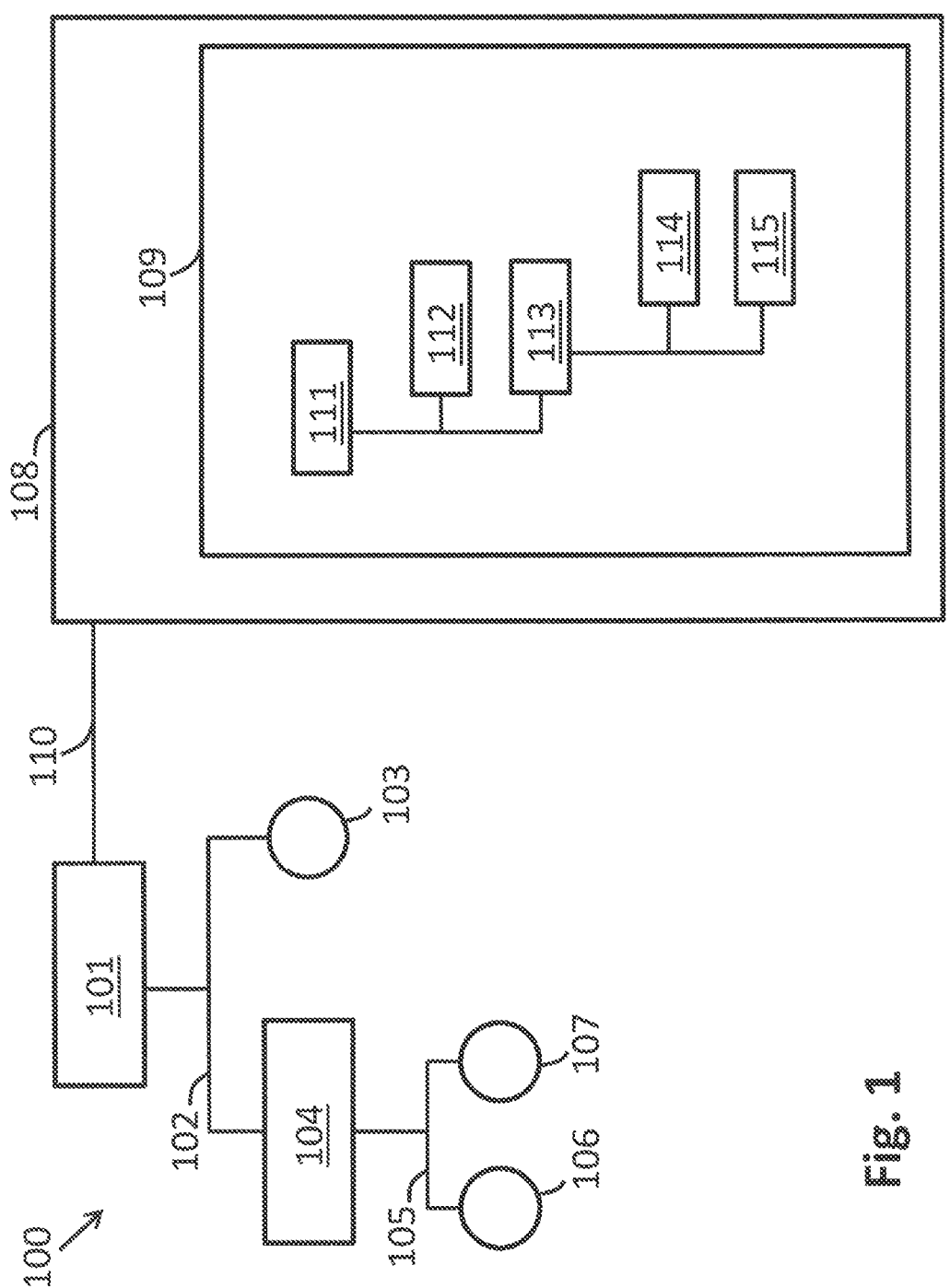
FIG. 1 shows the structure of a field bus network and an associated device access software, with drivers incorporated therein.

FIG. 1 shows a field bus network 100 comprising a plurality of field devices and gateway devices. On the topmost hierarchy level of the field bus network 100 is a field access device 101. The field access device 101 is connected to a field device 103 and a gateway device 104 via a Profibus segment 102. The Profibus segment 102 is coupled to a HART segment 105 via the gateway device 104, wherein the gateway device 104 is designed to convert the data traffic from the Profibus protocol into the HART protocol and vice versa. The two HART field devices 106 and 107 are connected to the HART segment 105.

The parameterization, configuration, and condition monitoring of the field devices of a field bus network are carried out by means of a general application 109 installed on a host 108. The host 108 is connected to the field bus network 100 via an Ethernet connection 110. The various components of the field bus network 100 may be accessed via the general application 109. The parameters of the various components of the field bus network 100 may, in particular, be read out, displayed, and modified from the general application 109. Moreover, the general application 109 enables a condition monitoring of the components of the field bus network 110. The data exchange that is required for these tasks is normally handled via what is known as acyclical data traffic.

In order to be able to correctly address the various components of the field bus network 100, the general application 109 requires information about the properties and parameters of the field devices, gateways, remote I/O's, etc., of the field bus network 100. This information is provided by the manufacturers of the different devices—normally in the form of device description files or device drivers. With the Profibus-DP, Profibus-PA, Fieldbus Foundation, and HART field bus protocols, device descriptions according to the DTM (Device Type Manager), DD (Device Description), EDD (Enhanced Device Description), and FDI Device Packages standards are used for device description for the acyclical data exchange. Especially with the EDD and DTM standards, graphical features and graphical user interfaces that should facilitate the parameterization and configuration of the respective field device are also specified, in addition to device parameters, device functionality, and address space assignment. In the EDD standard, special graphic commands that are executed in the manner of an interpreter language are provided for generating these graphical interfaces.

In the FDT/DTM standard, the DTM's (Device Type Managers) are provided in the form of dynamically loadable libraries (DLL's) or in the form of executable files (executables). A DTM also includes said graphic features. The various DTM's for the various components of the field bus network are integrated into a common FDT general application, wherein FDT stands for "Field Device Tool." A common general application is thereby provided into which the DTM's for various devices, and from different manufacturers, may be integrated.

In recent years, the FDT standard has been increasingly supplemented, and later replaced, by the FDI Device Packages standard.

In addition to the Profibus, Fieldbus Foundation, and HART field bus protocols that were discussed in the preceding, what are known as the Industrial Ethernet protocols have been gaining in importance, to which belong the EtherNet/IP, ProfiNet, and EtherCAT field bus protocols, among others. In the EtherNet/IP field bus protocol, a device description file corresponding to the EDS (Electronic Data Sheet) standard is provided for description of both the cyclical and acyclical data exchange.

In the example of FIG. 1, a general application 109 is installed on the host 108—preferably a general application of the field device tool (FDT) standard—wherein different drivers for the various devices and components of the field bus network 100 can be incorporated into the general application. For example, different Device Type Managers (DTM's) from different manufacturers can be incorporated into an FDT general application. In addition to DTM's, other device description files can also be incorporated into the general application. In this case, the hierarchical structure of the field network 100 within the general application 109 is simulated using drivers or device description files, wherein the arrangement of the drivers or device description files corresponds to the structure of the field bus network 100 in mirror image form. For accessing the components of the field bus network 100, a number of different device DTM's, gateway DTM's, and communication DTM's, for example, can be integrated into an FDT general application. The communications DTM 111 is at the uppermost position of the DTM topology. The communications DTM 111 is associated with the field access device 101 and communicates with this via the Ethernet connection 110. The communications DTM 111 represents, in a certain manner, the external interface of the device access software. All incoming and outgoing data traffic is directed via the communications DTM 111.

In the FDT topology, the device DTM 112 is arranged below the communications DTM 111 and simulates the functionality of the field device 103. A gateway DTM 113 that is associated with the gateway 104 is, moreover, arranged in the level below the communications DTM 111. The gateway 104 may be parameterized and configured via the gateway DTM 113. Located below the gateway DTM 113 in the FDT topology are two device DTM's 114, 115 via which the field devices 106, 107 can be accessed. Besides the FDT/DTM standard, there is a plurality of alternative standards for the device access software and the device drivers incorporated therein.

From the FDT general application, for example, a query can be directed to one of the field devices or to another component of the field bus network with which device specifications for the respective device are queried. In response to such a request, the respective field device transmits, for example, the manufacturer ID, the device ID, the device version or device revision, the device profile or profile revision, the software version or software revision, the protocol version or command revision to the FDT general application. Based upon this information about the individual devices, the FDT general application can graphically display for the user the hierarchical structure of the field bus network 100—preferably in the form of a tree structure.

The general application and the drivers incorporated therein were originally intended to be installed on a stationary host computer, wherein an automation network could be monitored from the stationary host computer. The central host computer was provided as a control station from which the user could retrieve, monitor, and change parameters of the various field devices and field bus components. With the general availability of mobile terminals such as, for example, tablets, laptops, personal digital assistants (PDA's), and smartphones, the need has arisen to interface such devices with the host computer in order to be able to query and modify parameters by means of the mobile terminal at any location of the automation network. It has proven very practical to inspect the field devices of the automation network on-site while also being able to check and modify the parameters of the field devices. In order to implement such a mobile access to the parameterization and configuration of field devices and other components of the field bus network, it is necessary to install the device drivers for the addressed field device on the respective mobile terminal and to provide a data connection between the host computer and the mobile terminal.

Figure 2:
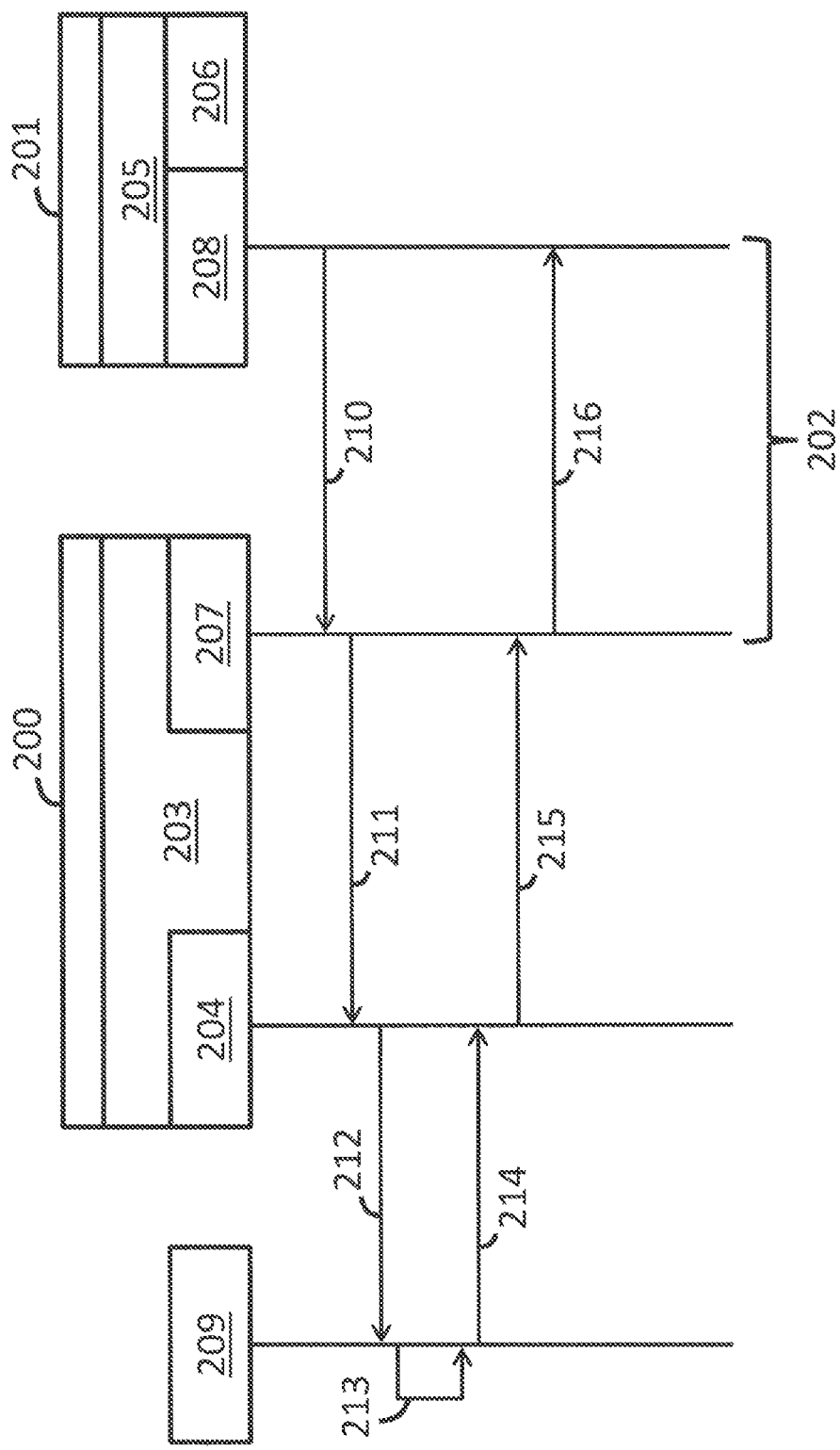
FIG. 2 shows data transmission in both directions between a client, a server, and a field device.

A system of this type for accessing a field bus network is shown schematically in FIG. 2. The access system comprises a server 200 as well as a client 201, which can exchange data with the server 200 via a data connection. The client 201 is preferably a mobile terminal. For example, the client 201 may be in data connection with the server 200 via computer network 202—preferably a wireless computer network. Preferably, the client 201 communicates with the server 200 via an Ethernet connection.

An FDT general application 203 is installed on the server 200. As with the conventional solution shown in FIG. 1, at least one communication driver 204 is incorporated into the FDT general application 203, in particular a communication DTM as well as, in some cases, one or more gateway DTM's. The communication with the field devices and the other components of the field bus network is handled via the at least one communication driver 204. In contrast to the solution shown in FIG. 1, at least some of the device DTM's are not installed on the server 200, but rather are relocated towards the client 201. For this purpose, an FDT general application 205 into which one or more device drivers 206 are integrated is installed on the client 201. For handling the communication between the server 200 and the client 201, a communication proxy 207 is provided on the server 200 and has a data connection with at least one communication stub 208 installed on the client 201 side. The at least one communication stub 208 is the communication driver of the client 201. The at least one communication stub 208 is provided on the client 201 for handling the data exchange with the communication proxy 207.

In the schematic representation shown in FIG. 2, only one client 201 is provided. Alternatively, several clients may also be in data connection with a central server 200, in which case at least one communication stub is installed on each of the clients and is in data connection with the communication proxy 207 of the central server 200.

The case will be discussed below where a user directs a query to the associated field device 209 from one of the device drivers 206 on the client 201. This request is transmitted from the respective device driver 206 via the associated communication stub 208, as indicated by the arrow 210, to the communication proxy 207. There, the incoming data traffic is fed into the associated communication channel and transmitted via the at least one communication driver 204 to the field device 209, as indicated by the arrows 211, 212. As illustrated in FIG. 2 by arrow 213, field device 209 answers the request and transmits the desired parameter via the at least one communication driver 204 to communication proxy 207, as indicated by the arrows 214, 215. From there, the information is transmitted via the computer network 202 to the respective communication stub 208 and to the respective device driver 206, as indicated by the arrow 216. For the device driver, the communication via the computer network 202 and the server 200 to the field device 209 is transparent.

Figure 3:
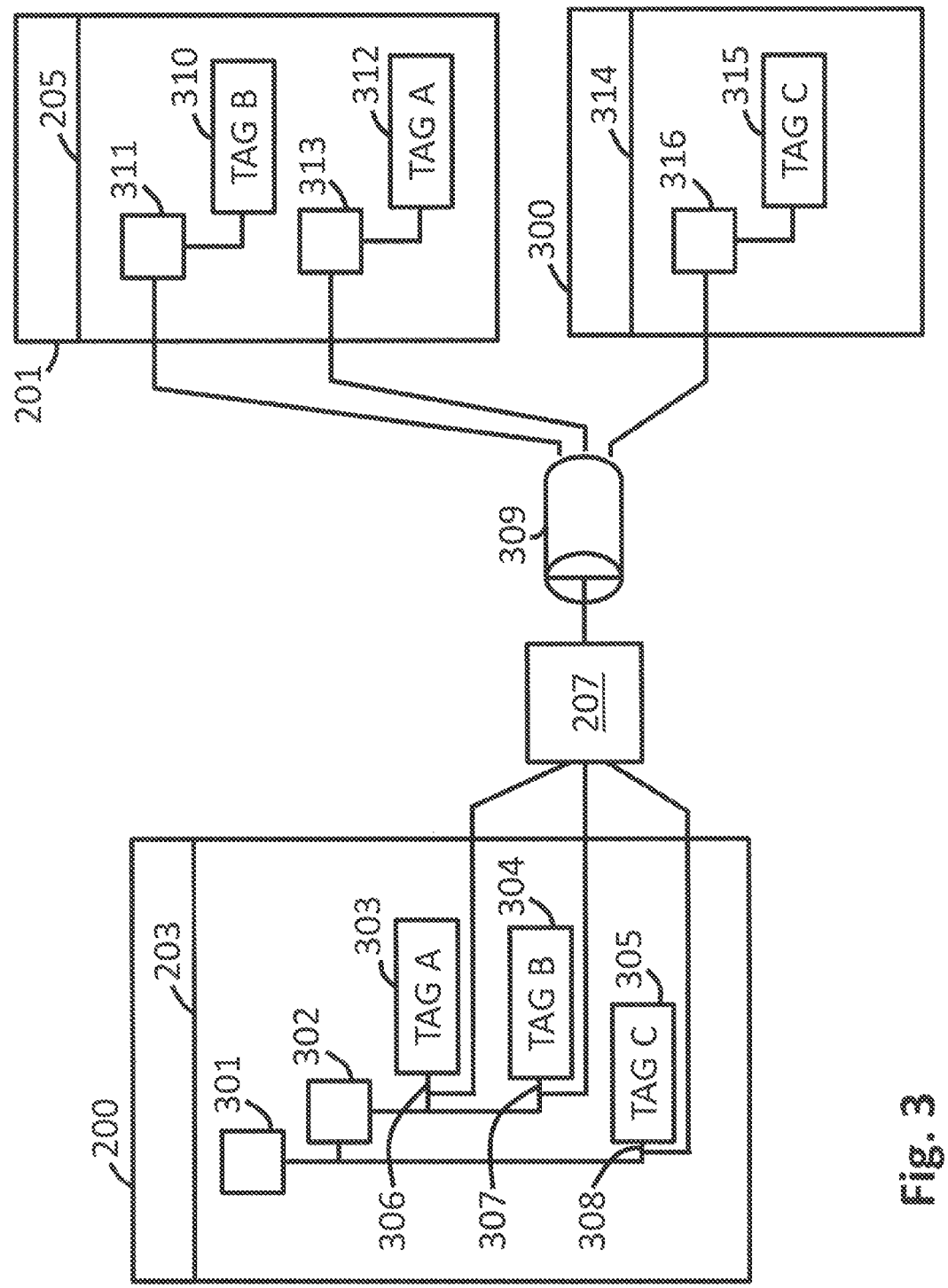
FIG. 3 shows a detailed illustration of the attachment of two clients to a server, wherein the data exchange is handled via a communication proxy.

In FIG. 3, the communication links between a server 200, a first client 201, and a second client 300 are shown in detail, wherein the communication links are again controlled via the communication proxy 207 which is provided on the server 200. Installed on the server 200 is the FDT general application 203, into which a communication DTM 301 and a gateway DTM 302 are integrated, via which the field bus network can be accessed. The device DTM's for accessing the field devices or field bus components are not, or at least not all, integrated into the FDT general application, but rather are shifted toward the clients 201, 300. Placeholder DTM's 303, 304, 305 are each inserted into the FDT topology on the server 200 side for the relocated device DTM's. These placeholder DTM's 303 through 305 serve as placeholders for the relocated device DTM's, which are installed on the clients 201, 300. The placeholder DTM's are used to uniquely identify the associated communication channels 306, 307, 308, as well as the field devices or field bus components which can be reached via these communication channels 306 through 308. In order to identify the respective field bus component and the associated communication channel, a so-called "tag" is used as a unique identifier. For example, a KKS identifier can be used as a tag according to the power station identification system, but the serial number and/or the manufacturer number of a component of the field bus network can also be used as a tag. Important in defining the tag is that each field device and every other component of the automation network be unique and clearly distinguishable. There are various alternatives for defining the tags. The respective tag can be stored either in the field device or the field bus components. Alternatively, the respective tag may be assigned to the device and then stored in the device. Another possibility is to set and use the tag in the FDT topology.

In the example of FIG. 3, the tags are used to identify the respective field device or the respective field bus component, the associated device DTM, and the communication channel, wherein the communication channel connects the field device or the field bus component to the associated device DTM.

In the example of FIG. 3, the communication channel 306 is provided with "Tag A" by means of the placeholder DTM 303, the communication channel 307 is identified with "Tag B" by the placeholder DTM 304, and the communication channel 308 is provided with "Tag C" by means of the placeholder DTM 305. The tags A, B, C provided by the placeholder DTM's serve as flags for the communication proxy 207, indicating at which point the data received from the clients 201, 300 must be fed into the communication channels 306 through 308 on the server 200 side. In this case, the associated communication channel is selected corresponding to the tag with which the received data traffic is identified. The data are then transmitted, via the selected communication channel, to the associated field device or the associated field bus component of the automation network.

In the opposite direction, the tags A, B, C provided by the placeholder DTM's indicate to the communication proxy 207 the locations at which the data traffic received from the field devices and the other components of the automation network can be extracted from the communication proxy 207 on the server 200 side. The field devices or field bus components of the automation network, as well as the associated communication channels 306 through 308, are respectively identified accordingly with "Tag A," "Tag B," "Tag C." The communication proxy 207 is then responsible for forwarding the respective data traffic to one of the respective connected clients 201, 300 via the communication medium 309.

In order to be able to communicate with the server 200, the IP address of the server 200 must be known respectively on the sides of the clients 201, 300. In addition, a list of field devices and field bus components in which the allocation of the field devices or field bus components to the associated tags is listed is transmitted to the clients 201, 300 from the server 200. Starting from this list, the appropriate software components for communicating with the server 200 and the automation network may be installed on the clients 201, 300. The FDT general application 205 is installed on the client 201. In this FDT general application 205, a suitable device DTM 310 is installed for accessing the field device and/or the field bus component, which is identified with "Tag B." Furthermore, an associated communication stub 311 is installed which handles the communication with the communication proxy 207, so that this communication stub 311 takes over the function of a communication DTM for the client 201. Moreover, a further device DTM 312 is incorporated in the FDT general application 205 and is provided for accessing the field device or field bus component marked with "Tag A." An associated communication stub 313 is also installed to this device DTM 312.

Corresponding software components are also installed on the second client 300. In the FDT general application 314 of the client 300, a device DTM 315 for accessing the component of the automation network identified with "Tag C" is incorporated, and an associated communication stub 316 is also provided.

The data exchange between the communication proxy 207 and the communication stubs 311, 313, 316 takes place via the communication medium 309. The communication medium 309 can be, for example, a computer network, e.g., Ethernet, wireless LAN, Internet, etc. The data connection between the communication proxy 207 and the communication stubs 311, 313, 316 is completely transparent for the user interacting with the respective device DTM 310, 312, 315. The user has the impression of being able to access the respective field device or the respective field bus component of the automation network directly via his mobile terminal and the device DTM installed thereon.

Figure 4:
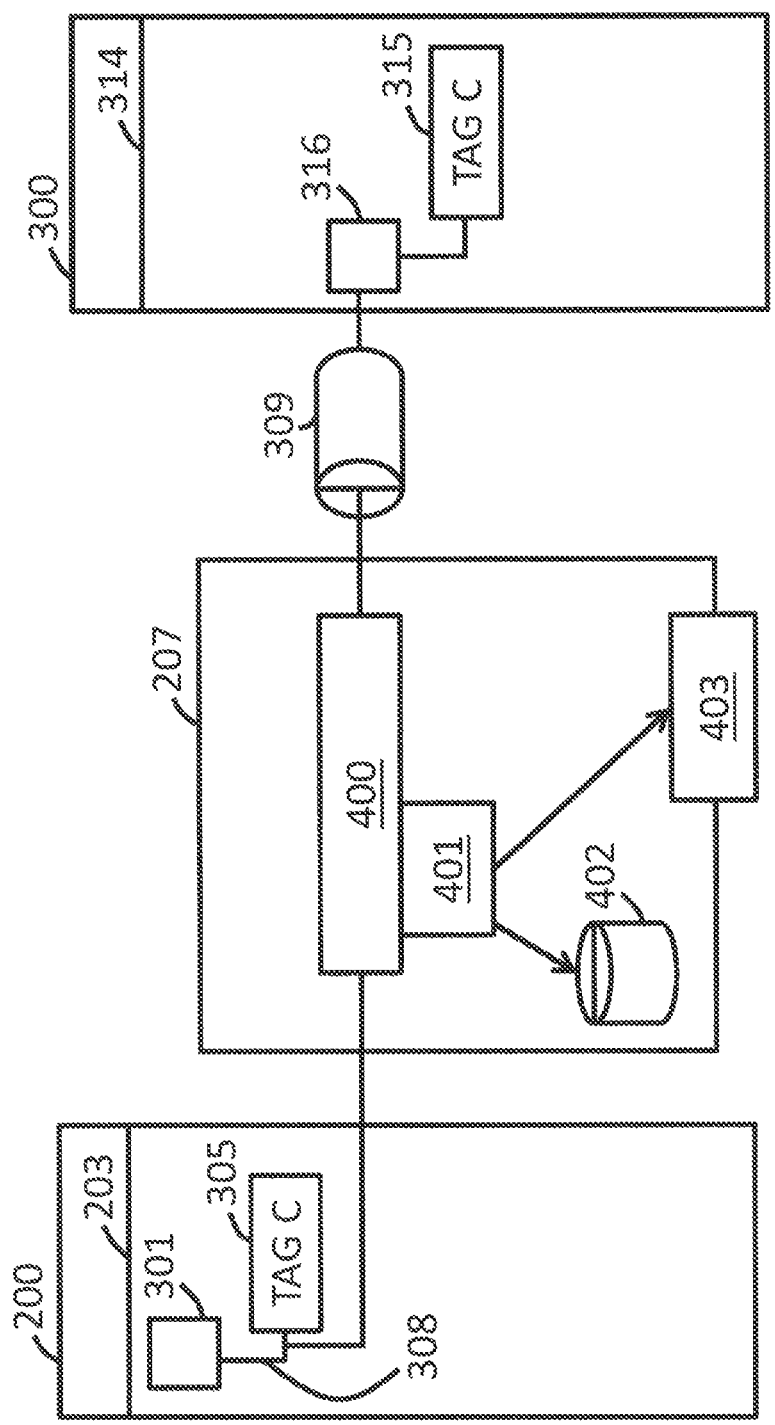
FIG. 4 shows the monitoring of the data transmission via the communication proxy, which reconciles the data transmission between client and server with a predetermined set of rules.

The connection between the server 200, the communication proxy 207, and the client 300 is represented once again in FIG. 4, wherein the communication proxy 207 shown in FIG. 4 additionally includes a test module for monitoring the data traffic between the server 200 and the client 300. The FDT general application 203 into which the communication DTM 301 as well as the placeholder DTM 305 identified with "Tag C" are integrated is installed on the server 200 shown in FIG. 4. The FDT general application 314 into which the device DTM 315 for "Tag C" and the associated communication stub 316 are integrated is installed on the client 300. The data connection between the server-side communication channel 308 and the client-side device DTM 315 is set up via the communication proxy 207, wherein the data can be exchanged between the server 200 and the client 300 via the communication medium 309.

On the communication proxy 207 side, the data exchange is handled in both directions by a communication module 400. The communication module 400 is responsible for, among other things, finding the appropriate tag in the FDT topology for requests directed from the client 300 to the server 200, in order to be able to feed the data stream on the server 200 side into the appropriate communication channel. The test module 401 is assigned to the communication module 400 and is designed to check incoming data from the server 200 or from the client 300. This checking of the data streams on both sides can be carried out, in particular, with consideration of the context of the data transmission, in an FDT/DTM environment. Therefore, when the data streams are checked by the test module 401, a comparison with the sequence provided in the FDT/DTM standard and with the time sequence of the data transmission can also be made. The test module 401 can be designed, for example, to reconcile incoming or outgoing communication against a predetermined set of rules 402, in order to detect faults and irregularities in the information exchange between client 300 and server 200.

In addition to analyzing the incoming and outgoing data streams, the test module 401 can also detect and evaluate response times of the various system components, for example. For example, long response times may indicate that faults occur in the data transmission which trigger a retransmission of the respective data. Such connection faults may arise when, for example, electromagnetic interferences are coupled into the connecting lines. Monitoring the response times provides an important building block for monitoring the data exchange.

All problems occurring during the data transmission, as well as the associated parameters such as response and delay times, can be transmitted to an evaluation module 403, which logs these faults as a function of time. It may be further provided for a statistical analysis of the errors and faults that occur to be carried out, in order to be able to identify hardware and software components frequently affected by faults.

In addition to error diagnosis and error logging, the test module 401 may be designed to rectify by suitable means any faults that occur. For example, suitable countermeasures for correcting the respective fault can be predefined in the set of rules 402 for different possible faults. Such measures may include, for example, terminating a data connection, blocking faulty data streams, and restarting different hardware and software components.

Several typical faults that can occur in a distributed FTD/DTM environment with server and client computers are described below. Suitable countermeasures for each fault described with which the respective fault can be addressed are discussed below.

Client is No Longer Signaling

In this fault, the proxy receives no messages from the client for a relatively long time. The cause of this may be a failure of the connection network between client and server—for example, due to poor reception quality of the WLAN. However, the cause could also be a software error on the client side or a failure of the client-side FDT general application with the communication stub incorporated therein. However, the cause for this error may also be that the user switches off his mobile terminal or moves with the mobile terminal from the area of the connection network. The occurrence of this error results in an increasing number of connections being open on the server side and no longer being operated by the associated clients, and therefore consuming more and more resources of the server over time. For detecting this interference, a timeout function, set to a predetermined value each time a message is received by the client, may be provided on the communication proxy side, for example. A timeout error is, then, present when the client is no longer signaling within the predefined time period. As an alternative to this timer functionality, the client could also be pinged at regular intervals by the server, wherein, as a result of the regular pinging, a fault on the client side can be detected. To monitor the activity of the client, it could alternatively be provided for the FDT data traffic to be monitored. When such a client timeout has occurred, the server independently terminates the connection to the client. In this way, the progressive consumption of resources by more and more inactive connections can be prevented. For example, to cut the existing data connection to the client, the communication proxy may emulate the functionality of the device DTM installed on the client and inject the corresponding commands for terminating the connection into communication with the server.

If an existing data connection is terminated by the communication proxy 207, it may happen that the client signals again after a long time and tries to transmit data to the server via the already-terminated data connection. The user then waits for a response of the server at his respective mobile terminal, but does not receive it because the data connection has already ended. In order to be able to detect this properly, the communication proxy could maintain a list of the terminated data connections. The communication proxy would compare the request received from the client with this list, could then recognize that the request relates to an already broken connection, and could send a corresponding error message to the client. This would have the advantage that the user is informed of the timeout of the connection and is given the option of setting up a new connection to the server via the client.

Client is Sending Data that does not Match the Current FDT State

By analyzing the data obtained from the client, the communication proxy can draw conclusions about the type of message just received and, in particular, can recognize that the communication just received does not match the current status of the FDT state machine. The cause of this error could, for example, be a malfunction of the device DTM installed on the client. In this case, the communication proxy would block the apparently faulty data and not forward them to the server. The communication proxy here would thus perform a function comparable to a firewall. In addition, it could be provided that the communication proxy output a corresponding error message.

Receipt of Corrupted Data from the Client

If the client transmits corrupt data to the communication proxy, this can, for example, be due to a software malfunction having occurred in the device DTM. On the side of the communication proxy, the test module can detect corrupted data and block the corrupted data, so that they are not forwarded to the server. Furthermore, the test module generates a corresponding error message.

Use of a Tag that does not Exist in the Topology

In this error case, the client sends a request to the communication proxy to establish a connection to a particular tag. On the communication proxy side, however, the test module detects that the corresponding tag does not exist in the FDT topology. Even in this case, the request of the client is blocked and not forwarded to the server. Furthermore, a corresponding error message is generated.

Communication Proxy Receives No Feedback from the Field Device Over an Extended Period If the communication proxy receives no feedback from a field device or a field bus component or from the communication drivers over a prolonged period of time, then the reason for this may, for example, be a network failure, an error of the software components, in particular the FDT general application and the communication drivers, an error on the field device side, or connection and grounding problems in the connection to the field device. On the communication proxy side, a timer functionality can be provided which checks whether a feedback from the field device or from the field bus component is present within a predetermined time interval. If there is no feedback within the predetermined period of time, then there is a timeout error. In this case, the communication proxy will terminate the data connection via the communication drivers to the automation network and output an error message. Moreover, the communication proxy can automatically undertake measures for error correction. For example, the communication proxy could initiate a restart of the field device or the field bus component and/or a restart of software components, i.e., for example, the FDT general application, and of one or more communication drivers.

Communication Proxy Receives Data from the Communication Drivers that do not Match the Current FDT State The test module of the communication proxy analyzes the data obtained from the communication drivers and checks whether these data match the current state of the FDT state machine. If the received data do not match the current state, the communication proxy blocks forwarding of the data to the client. Moreover, the communication proxy can initiate further fault recovery measures—for example, breaking the connection, restarting the FDT general application, etc.

Receipt of Corrupted Data from the Communication Drivers

The test module of the communication proxy analyzes the data received from the communication drivers and recognizes that the data is corrupted. The reason for this may be an error in the field device, but it is also possible for the connection and grounding problems to be responsible for the corrupted data. Moreover, it can also be due to the software components, i.e., in particular, to the FDT general application and the communication drivers, that the communication proxy receives corrupt data. On the side of the communication proxy, the corrupted data are blocked and not forwarded to the client. In addition, it is possible, for example, for the communication proxy, for error correction, to break the connection and restart various components. For example, the test module could analyze the corrupted data and draw conclusions from this as to which component of the field bus network caused the fault, in order to then restart this component in a targeted manner. A useful strategy could also be to restart the field device first, then to detect whether the data are still corrupted, and then to restart further components of the field bus network in the next step.

Access to the Wrong Field Device or the Wrong Field Bus Component

In the case of this error, the field device B is accessed instead of the field device A; however, at first glance, it looks as if the device A was accessed. The reason for this may be a software fault in a gateway DTM, in the communication DTM, or an error in the field access device. On the communication proxy side, this error can be detected by the serial number or device address in the transmitted data not matching the communication channel address. In this case, the communication proxy would not forward the received data to the client. Moreover, the communication proxy could cause a restart of the responsible system components.

FDT General Application is not Responding or is Responding Only Very Slowly

A missing or overdue response of the FDT general application could be detected on the communication proxy side based upon a lengthening of the response times or the occurrence of a timeout. The communication proxy could then initiate a restart of the FDT general application.

System Load on the Computer is Very High

A high system load can be caused, for example, by a high memory consumption or by a high network load and is reflected in long response times that can be detected by the communication proxy. The communication proxy would alert the user of the high system load and possibly suggest terminating individual operations.

Failure of Required System Components

The failure of required components, e.g., the failure of the database server required by the FDT general application, leads, when responding to requests, to timeout errors, which are detected by the communication proxy. From the occurrence of the errors, the communication proxy could determine which component has failed and initiate a restart of this component.

The invention claimed is:

1. A device access apparatus for a client-server system including a server and a client, wherein the device access apparatus is used to access components of a field bus network, the device access apparatus including:
   a general application installable on the server and configured to interchange data with the components of the field bus network;
   a device driver installable on the client; and
   a communication proxy configured to set up at least one data connection between the server and the client, wherein the at least one data connection is used to transmit data between the device driver and one of the components of the field bus network that is associated with the device driver; wherein the communication proxy is configured to monitor data traffic on the at least one data connection between the client and the server and to detect errors in data transmission;
   wherein the communication proxy is configured to terminate the at least one data connection if the client does not respond or is inactive during at least one predetermined period of time;
   the communication proxy is configured to block a request to the server if the communication proxy receives the request from the client with a tag of an already terminated connection;
   the communication proxy is configured to block the data transmitted to the server if the communication proxy receives corrupt data or data that does not correspond to a current status of a protocol sequence in the general application from the device driver on the client;
   the communication proxy is configured to block the data transmitted to the server if the communication proxy receives a message from the client with a tag that is not provided in a topology managed by the general application;
   the communication proxy is configured to terminate the at least one data connection if one of the components of the field bus network does not respond to requests or is inactive during the at least one predetermined period of time;
   the communication proxy is configured to restart for error correction of at least one of the following: the general application on the server, at least one communication driver on the server, a field access device of the field bus network, and one of the components of the field bus network;
   the communication proxy is configured not to forward the data to the client if the communication proxy receives corrupt data from the general application of the server;
   the communication proxy is configured not to forward the data to the client if the communication proxy receives data from the general application of the server that does not correspond to the current status of the protocol sequence in the general application; or
   the communication proxy is configured to initiate a restart of a respective component if the communication proxy detects that one of following components has crashed or reacts with a delay: one of the components of the field bus network, a field access device of the field bus network, the general application on the server, at least one communication driver on the server, and components utilized by the general application.

2. The device access apparatus of claim 1, wherein the communication proxy is configured to compare the data transmission between the client and the server with a predetermined set of rules in order to detect errors.

3. The device access apparatus of claim 1, wherein: the communication proxy is configured to automatically initiate measures for error correction when errors are detected; or the communication proxy is configured to automatically initiate measures for error correction as a function of an error profile when errors are detected.

4. The device access apparatus of claim 1, wherein the general application is an FDT general application.

5. The device access apparatus of claim 1, wherein: the communication proxy is configured to log detected errors; the communication proxy includes a cache function capability for storing responses to previous requests of the client and making them available during subsequent requests of the client; the communication proxy is configured to create error statistics indicating components on which errors are occurring; or the communication proxy is configured to detect response times of the field bus network and/or response times of the client, compare them to expected values, and derive therefrom information for error diagnosis.

6. The device access apparatus of claim 1, wherein: the communication proxy is configured to block data transmitted from the client to the server when there is a lack of data integrity; or the communication proxy is configured to block data transmitted from the field bus network to the client when there is a lack of data integrity.

7. The device access apparatus of claim 1, wherein the communication proxy is configured to terminate data connections between the server and the client that are not used over a prescribed period of time.

8. The device access apparatus of claim 1, wherein the communication proxy is configured to monitor the data transmission and to initiate at least one of the following as a function of a respective error pattern: terminating the at least one data connection between the client and the server; non-forwarding and blocking of erroneous data; correcting a data stream; shutting down a hardware or software component; restarting the components of the field bus network; restarting the general application; restarting at least one of a plurality of communication drivers integrated into the general application; and restarting a field access device of the field bus network.

9. The device access apparatus of claim 1, wherein one of the components of the field bus network, an associated communication channel, and an associated device driver are identified by a unique tag, wherein the unique tag enables the field bus component, the associated communication channel, and the associated device driver to be assigned to each other.

10. The device access apparatus of claim 1, wherein: the communication proxy is configured to feed data traffic that the communication proxy receives from the device driver installed on the client corresponding to a tag of the data traffic into an associated communication channel; or the communication proxy is configured to forward the data traffic that the communication proxy receives via communication channels provided by communication drivers corresponding to the tag of the data traffic to an associated device driver on the client.

11. The device access apparatus of claim 1, wherein the communication proxy is configured to set up the at least one data connection between the client and the server over a computer network; the communication proxy is configured to set up the at least one data connection between the client and the server via the computer network, wherein the computer network is at least one of the following: a wireless LAN, an Ethernet connection, and an Internet connection; the client is a mobile terminal; or the client is at least one of following: a laptop, a tablet, a mobile phone, a smart phone, and a PDA.

12. The device access apparatus of claim 1, wherein driver or user software components are incorporated into the general application according to one or more of the following standards: DTM, DD, EDD, EDS, and FDI Device Packages; or the general application is an FDT general application, and the driver and user software components of the standard DTM are incorporated into the FDT general application.

13. A server connectable to a field bus network, wherein the server is configured to support a data connection to a client, the server including:
a general application installed on the server and configured to interchange data with components of the field bus network; and
a communication proxy configured to set up at least one data connection between the server and the client, wherein data is transferable via a data connection between a device driver installed on the client and one of the components of the field bus network assigned to the device driver;

wherein the communication proxy is configured to monitor data traffic on the at least one data connection between the client and the server and to detect errors in data transmissions;
wherein the communication proxy is configured to terminate the at least one data connection if the client does not respond or is inactive during at least one predetermined period of time;
the communication proxy is configured to block a request to the server if the communication proxy receives the request from the client with a tag of an already terminated connection;
the communication proxy is configured to block the data transmitted to the server if the communication proxy receives corrupt data or data that does not correspond to a current status of a protocol sequence in the general application from the device driver on the client;
the communication proxy is configured to block the data transmitted to the server if the communication proxy receives a message from the client with a tag that is not provided in a topology managed by the general application;
the communication proxy is configured to terminate the at least one data connection if one of the components of the field bus network does not respond to requests or is inactive during the at least one predetermined period of time;
the communication proxy is configured to restart for error correction of at least one of the following: the general application on the server, at least one communication driver on the server, a field access device of the field bus network, and one of the components of the field bus network;
the communication proxy is configured not to forward the data to the client if the communication proxy receives corrupt data from the general application of the server;
the communication proxy is configured not to forward the data to the client if the communication proxy receives data from the general application of the server that does not correspond to the current status of the protocol sequence in the general application; or
the communication proxy is configured to initiate a restart of a respective component if the communication proxy detects that one of following components has crashed or reacts with a delay: one of the components of the field bus network, a field access device of the field bus network, the general application on the server, at least one communication driver on the server, and components utilized by the general application.

14. An automation technology system, including:
a server, including:
a general application installed on the server and configured to interchange data with components of a field bus network; and
a communication proxy configured to set up at least one data connection between the server and a client, wherein data is transferable via a data connection between a device driver installed on the client and one of the components of the field bus network assigned to the device driver;
wherein the communication proxy is configured to monitor data traffic on the at least one data connection between the client and the server and to detect errors in data transmission; and the client, including: the device driver installed on the client; wherein an associated component of the field bus network is accessible from the client using the device driver;

wherein the communication proxy is configured to terminate the at least one data connection if the client does not respond or is inactive during at least one predetermined period of time;

the communication proxy is configured to block a request to the server if the communication proxy receives the request from the client with a tag of an already terminated connection;

the communication proxy is configured to block the data transmitted to the server if the communication proxy receives corrupt data or data that does not correspond to a current status of a protocol sequence in the general application from the device driver on the client;

the communication proxy is configured to block the data transmitted to the server if the communication proxy receives a message from the client with a tag that is not provided in a topology managed by the general application;

the communication proxy is configured to terminate the at least one data connection if one of the components of the field bus network does not respond to requests or is inactive during the at least one predetermined period of time;

the communication proxy is configured to restart for error correction of at least one of the following: the general application on the server, at least one communication driver on the server, a field access device of the field bus network, and one of the components of the field bus network;

the communication proxy is configured not to forward the data to the client if the communication proxy receives corrupt data from the general application of the server;

the communication proxy is configured not to forward the data to the client if the communication proxy receives data from the general application of the server that does not correspond to the current status of the protocol sequence in the general application; or the communication proxy is configured to initiate a restart of a respective component if the communication proxy detects that one of following components has crashed or reacts with a delay: one of the components of the field bus network, a field access device of the field bus network, the general application on the server, at least one communication driver on the server, and components utilized by the general application.

15. A method for monitoring data traffic between a server and a client of a client-server system, via which components of a field bus network are accessible, wherein a general application is installed on the server and is configured to exchange data with the components of the field bus network, wherein a communication proxy is configured to set up at least one data connection between the server and the client, the at least one data connection used to transmit data between a device driver installed on the client and one of the components of the field bus network associated with the device driver, wherein the method comprises:

monitoring data traffic on the at least one data connection between the client and the server via the communication proxy; and detecting errors in data transmission;

wherein the communication proxy is configured to terminate the at least one data connection if the client does not respond or is inactive during at least one predetermined period of time;

the communication proxy is configured to block a request to the server if the communication proxy receives the request from the client with a tag of an already terminated connection;

the communication proxy is configured to block the data transmitted to the server if the communication proxy receives corrupt data or data that does not correspond to a current status of a protocol sequence in the general application from the device driver on the client;

the communication proxy is configured to block the data transmitted to the server if the communication proxy receives a message from the client with a tag that is not provided in a topology managed by the general application;

the communication proxy is configured to terminate the at least one data connection if one of the components of the field bus network does not respond to requests or is inactive during the at least one predetermined period of time;

the communication proxy is configured to restart for error correction of at least one of the following: the general application on the server, at least one communication driver on the server, a field access device of the field bus network, and one of the components of the field bus network;

the communication proxy is configured not to forward the data to the client if the communication proxy receives corrupt data from the general application of the server;

the communication proxy is configured not to forward the data to the client if the communication proxy receives data from the general application of the server that does not correspond to the current status of the protocol sequence in the general application; or the communication proxy is configured to initiate a restart of a respective component if the communication proxy detects that one of following components has crashed or reacts with a delay: one of the components of the field bus network, a field access device of the field bus network, the general application on the server, at least one communication driver on the server, and components utilized by the general application.

16. The method of claim 15, further including: reconciling the data traffic with a predetermined set of rules via the communication proxy; or in the event of errors, initiating measures for error correction via the communication proxy.

* * * * *